United States Patent
Schnell

(10) Patent No.: US 7,178,663 B2
(45) Date of Patent: Feb. 20, 2007

(54) CONDUCTOR LOOP

(75) Inventor: Wolfgang Schnell, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 10/559,032

(22) PCT Filed: Sep. 16, 2004

(86) PCT No.: PCT/DE2004/002064

§ 371 (c)(1),
(2), (4) Date: Nov. 30, 2005

(87) PCT Pub. No.: WO2005/030621

PCT Pub. Date: Apr. 7, 2005

(65) Prior Publication Data

US 2006/0118394 A1    Jun. 8, 2006

(30) Foreign Application Priority Data

Sep. 25, 2003    (DE) .............................. 103 44 921

(51) Int. Cl.
*B65G 43/02* (2006.01)
(52) U.S. Cl. .............................. 198/810.03; 198/810.02
(58) Field of Classification Search .......... 198/810.03, 198/810.02, 810.04
See application file for complete search history.

(56) References Cited

U.S. PATENT DOCUMENTS 3,713,113 A * 1/1973 Kohzuma et al. ............. 365/73
3,834,518 A * 9/1974 Specht et al. .......... 198/810.02
3,834,524 A * 9/1974 Ratz et al. ............. 198/810.02
4,621,727 A    11/1986 Strader et al.
4,854,446 A * 8/1989 Strader .................. 198/810.02
5,168,266 A * 12/1992 Fukuda ...................... 340/676
6,352,149 B1 * 3/2002 Gartland ................ 198/810.02
6,581,755 B1    6/2003 Wilke et al.

FOREIGN PATENT DOCUMENTS

| AT | AU 442872 | 11/1973 |
| DE | 19607867 | 9/1997 |
| DE | 19827120 | 12/1999 |
| EP | 1097094 | 5/2001 |
| GB | 1246786 | 9/1971 |

* cited by examiner

*Primary Examiner*—Douglas Hess
(74) *Attorney, Agent, or Firm*—Collard & Roe, P.C.

(57) ABSTRACT

The invention relates to a conductor loop, embedded in a polymer, in particular an elastomeric material, in the form of a flex construction, comprising a single flex, or multiple flexes, whereby each flex, for its part, comprises at least two individual wires, in particular, as a component of a transport belt, with a support side, a running side and an embedded tensile support, whereby the transport belt is provided with at least one conductor loop. The conductor loop is characterized in being embodied as an open flex helix, whereby each individual wire is enclosed by polymeric material.

13 Claims, 5 Drawing Sheets

CONDUCTOR LOOP

CROSS REFERENCE TO RELATED APPLICATIONS

Figure 1:
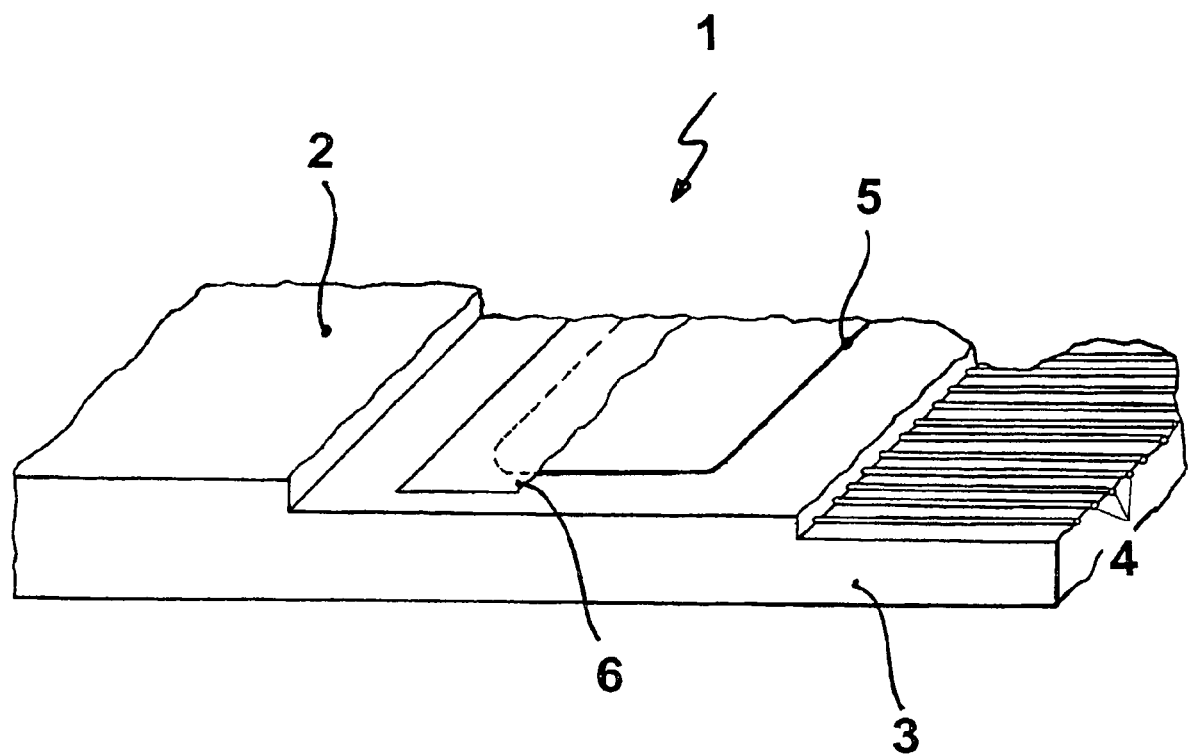

Applicant claims priority under 35 U.S.C. § 119 of German Application No. 103 44 921.3 filed Sep. 25, 2003. Applicant also claims priority under 35 U.S.C. § 365 of PCT/DE2004/002064 filed Sep. 16, 2004. The international application under PCT article 21(2) was not published in English.

The invention relates to a conductor loop that is embedded in a polymer material, particularly an elastomer material, and is present as a flex construction, comprising a single flex, or multiple flexes, whereby each flex, in turn, consists of at least two individual wires, particularly as a component of a conveyor belt, which comprises a support side, a running side, and an embedded strength support, whereby the conveyor belt is provided with at least one conductor loop. In this regard, reference is particularly made to the following state of the art: DE 196 07 867 A1 and EP 1 097 094 B1.

It is usual to equip conveyor belts with conductor loops (short-circuit rings), in order to-recognize the occurrence of lengthwise slits. These short-circuit rings are checked for intactness by means of a transmitter/receiver combination. When a lengthwise slit occurs in the conveyor belt, the conductor loop is also destroyed, and the transmitter/receiver transmission segment is interrupted. In this way, a criterion is obtained for stopping the conveyor belt at the beginning of the slitting process, and limiting the length of the slit. The maximally possible length of the slit is thereby limited to the distance between two conductor loops. Unfortunately, after extended use of the conveyor belts, false alarms increasingly occur, which are triggered due to the fact that the conductor loop was destroyed without any slit in the belt having occurred.

The conductor loops usually consist of metal cords that are installed in meander shape, particularly of steel cords. The cords, in turn, mostly consist of at least five flexes. In this connection, a cord construction of the 7×7 type is preferred, with an individual wire diameter of approximately 0.2 mm, and a total diameter of approximately 1.5 to 2 mm. There are also variants that consist of a mixed structure of copper flexes and steel flexes, whereby the steel flexes sheath the copper flex. Another version, consisting of a solid copper wire sheathed with steel flexes is also known.

The meander-shaped installation (DE 196 07 867 A1, FIG. 1) is required in order to increase the elongation capacity of the loops, since otherwise they would be destroyed after a relatively short period of time, due to the mechanical stress in the conveyor belt, namely bending stress and impact stress. The production of the meanders requires the use of a relatively ductile material, and this has a negative effect on the useful lifetime of the loop. While materials having greater elasticity significantly increase the long-term strength of the individual cord, they make it more difficult to shape it into meanders. Even the use of so-called "high elongation" cords (HE cords), which are more capable of elongation than normal cords, due to their structure, improves the useful lifetime but also makes it more difficult to shape the meanders.

The task of the invention now consists in making available a highly flexible and highly elongation-capable conductor loop having an improved useful lifetime, which facilitates formation of the meanders, or in the case of which it is possible to do without the meander formation.

This task is accomplished, according to the invention, in that the conductor loop is configured as an open flex helix, whereby each individual wire is enclosed by polymer material.

Practical embodiment of the flex helix are discussed below.

The increase in the useful lifetime and a significant improvement in the elongation behavior of the new conductor loop can be achieved by means of reducing the individual wire diameter, which preferably amounts to 0.01 to 0.2 mm, and a modified structure of the starting material for the production of the conductor loops. When using flexes shaped into a helix, instead of the cords, the elongation capacity achieved is so good that meandering is not necessary. This shaping or loosening of the loop construction can be achieved, for example, in that a steel cord, preferably in the HE construction, is broken down into its individual flex components. The reshaped flexes can be used both individually and as double or triple flexes. In this connection, a conductor loop that is open in itself and capable of elongation is formed, in which the polymer material (e.g. rubber) in which the conductor loop is embedded can flow around each individual wire, and thereby fixes it in place spatially relative to the other wires of the flex, whereby the good elongation capacity of the entire flex is maintained. However, the number of individual wires that cross and touch one another is drastically reduced. In this way, the relative movements of the individual wires and individual flexes, against one another, which occur, in stress during practical use, as the result of bending, distortion (trough formation, running around a drum), or impact, and which are the cause for fatigue and breakage of the loops at the intersection points and/or contact points of the wires, are prevented to the greatest possible extent. Specifically these relative movements result in fatigue and breakage of the wires in the case of the cords used until now, and which cannot be prevented by the meander-shaped installation, either.

In order to keep the electrical resistance of the loop arrangement as low as possible, several loops that are disposed concentrically at a relatively slight distance from one another can also be used. The distances between the loops disposed in this manner can be between one and fifty times the diameter of the individual flex.

It is advantageous to partially connect the loops that are disposed concentric to one another with one another, and thereby to fix their position relative to one another in place. This facilitates handling during production, and the result is achieved that the loops do not shift relative to one another during the production of the conveyor belt, or lie on top of one another. This connection can also be achieved in that the loops are fixed in place on a woven support fabric, particularly by means of sewing, gluing, vulcanizing, or clamping them on. If the connection consists of an electrically conductive material, it is possible to achieve the result that breaks of individual wires or flex breaks reduce the electrical resistance of the entire loop, which after all consists of several individual loops, less greatly than if an entire individual loop fails. In any case, the connection should preferably consist of a flexible material that is capable of elongation, or of thin filaments or yarns, which material is used in thin layers of a few tenths of a millimeter up to a thickness of 1.5 mm.

Instead of the individual loops that are closed in themselves, which must also be made endless individually by means of a splice, a spiral-shaped installation of the flex helix is also possible. Such a shape does not have to be made endless by means of splices, and instead, the connection from beginning to end of the flex helix can also take place by means of a flexible, thin, and electrically conductive material.

Aside from the helix-shaped flex of which the loop consists, special, electrically conductive adhesive strips are also suitable for the production of this connection, but curable adhesives that can also form an electrically conductive film are also suitable. Suitable materials are, for example, modified polyester resins or epoxy resins, but also polyurethane, silicone, thermoplastic elastomer, or rubber materials (e.g. highly conductive rubber). The modification to achieve sufficient electrical conductivity can take place by mixing in electrically conductive materials such as metal powder, carbon black, and/or conductive polymers, in sufficient concentration. So-called nano-scale metallic fillers of silver, nickel, aluminum, or also silver-plated or gold-plated nickel, which already result in good conductivity at relatively low concentrations, are particularly suitable for this purpose. The use of so-called organic metals (conductive polymers) is also very promising. A combination of different fillers or filler types to achieve sufficient electrical conductivity is also possible.

It is also possible to connect the individual loops or loop segments by means of the same or a similar flex as the one of which the loop consists, and to fix it in place with a suitable adhesive material, aside from the known connection techniques such as soldering or by means of pinch sleeves.

Making the conductor loop endless (producing a splice) and connecting the loop segments and the partial loops can take place by means of simply laying the open flexes into one another in similar manner as for the production of splices in steel cords, or by means of soldering or the use of pinch sleeves. In this connection, it is not absolutely necessary to fix this splice in place; it is sufficient if the splice length is sufficiently long. Fixation takes place by means of the polymer material into which the conductor loop is embedded, or by means of a suitable flexible adhesive. The use of an electrically conductive material is also optimal for this purpose.

To facilitate handling during construction of the loop arrangement and its later installation into the belt, it is sensible to carry this out on a suitable, relatively thin woven fabric. In this connection, the loop can be fixed in place at several points (particularly at the deflections) on this woven fabric, by means of gluing it on or sewing it on with a textile thread. This ensures that the geometry of the loop does not change in uncontrolled and undesirable manner during further processing.

The installation of the woven fabric with the conductor loop into the conveyor belt then preferably takes place in such a manner that the side of the woven fabric on which the loop is situated is laid inward (towards the core). This measure also serves to improve the useful lifetime of the conductor loop, since thereby the stress due to impact is reduced; this is because the woven fabric, which lies towards the cover plate, will absorb a large portion of the impact energy of the transported goods placed on the conveyor belt, i.e. spread it out over a larger area, and thereby protect the loop of course the woven fabric must possess a preparation to achieve a good adhesion to the embedding polymer.

Usually, the conductor loops are installed in rectangular shape, with rounded corners, whereby two loops are disposed concentric to one another, in most cases. Under some circumstances, it can be advantageous to deviate from the rectangular shape and configure the loops as an oval or circular, for example whereby here again, a concentric arrangement of two or more loops is possible. Such a special shape is represented by the spiral-shaped arrangement already described, which can also be configured to be elliptical or quasi-circular.

Figure 2:
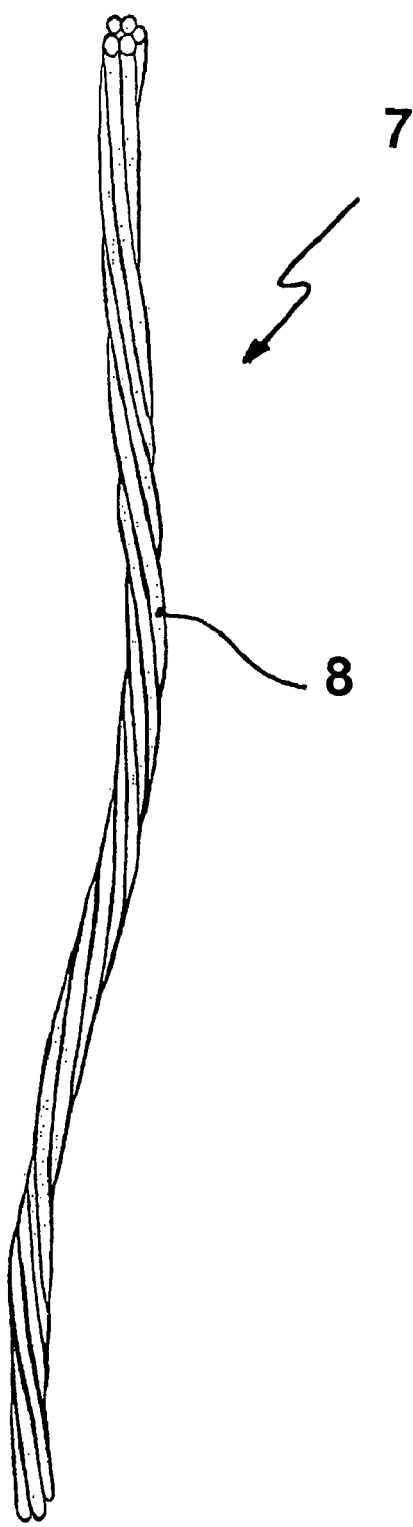
Figure 3:
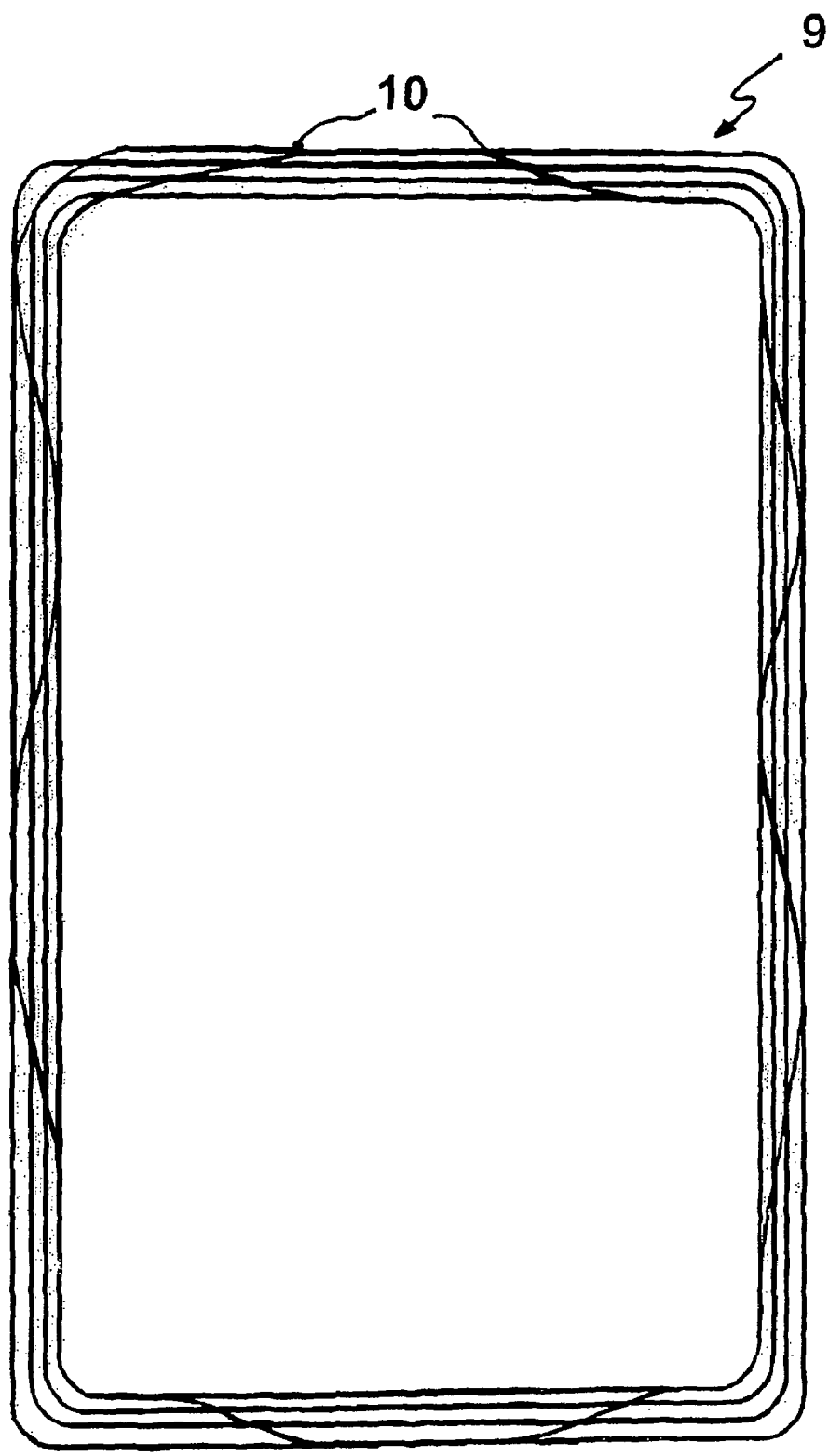
Figure 4:
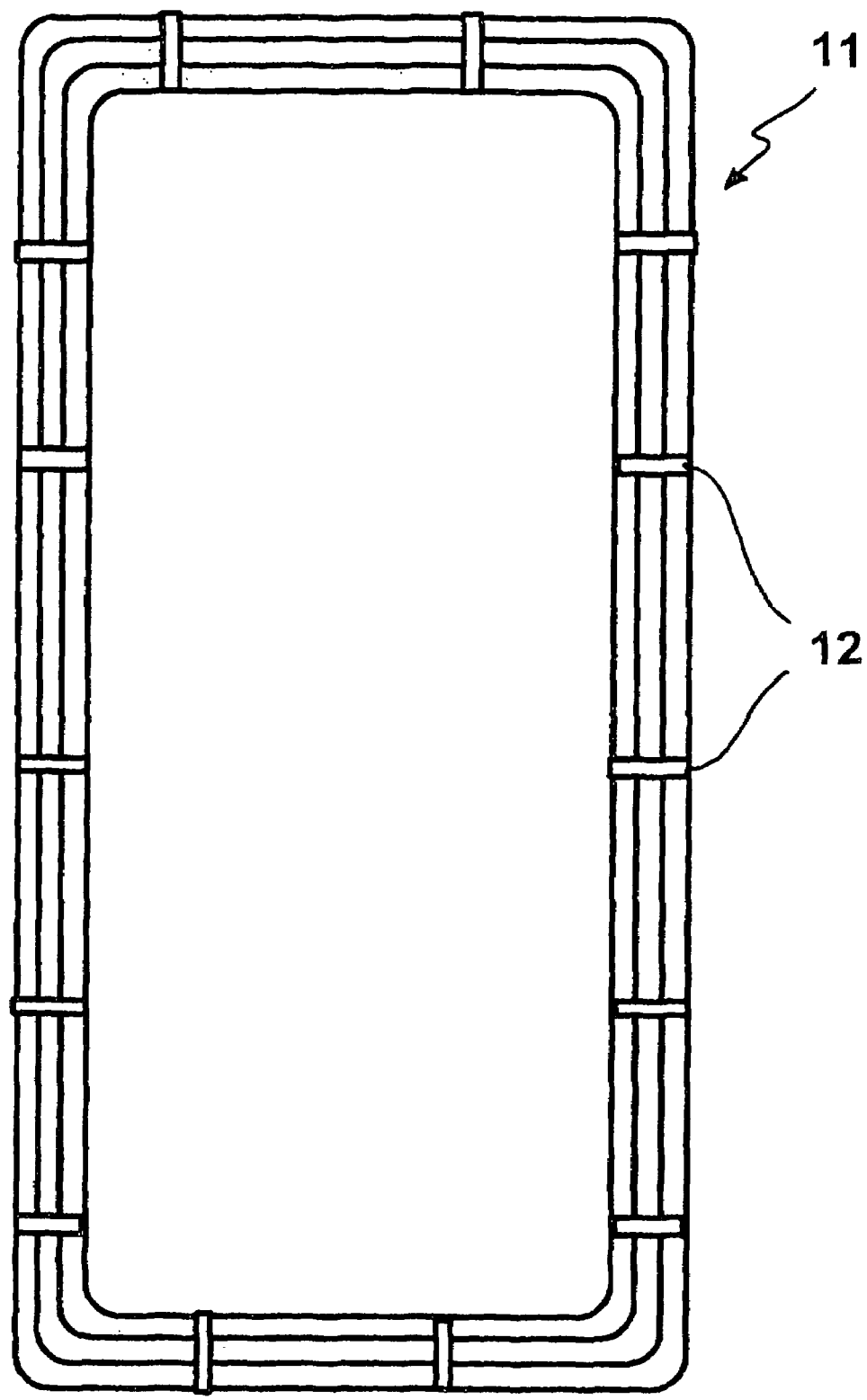
Figure 5:
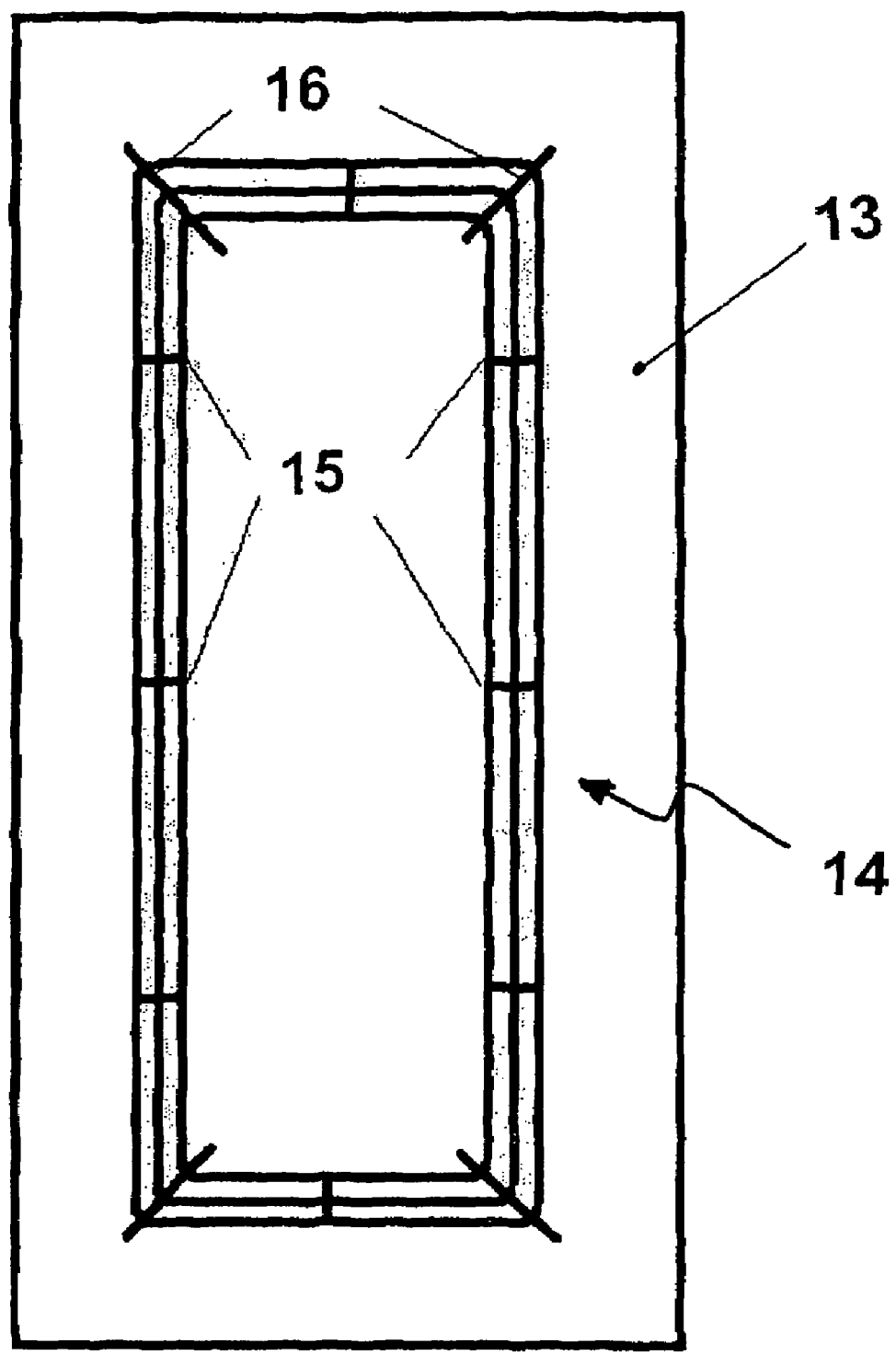

The invention will now be briefly explained, making reference to schematic drawings. These show:

FIG. 1 a steel cable transport belt having a conductor loop on woven support fabric;

FIG. 2 a flex helix;

FIG. 3 a spiral loop having cross-connections;

FIG. 4 a multiple loop having cross-connections;

FIG. 5 a conductor loop on woven support fabric, with corner fixation.

In connection with these figures, reference is made to the reference symbol list.

REFERENCE SYMBOL LIST 1 conveyor belt
2 support side
3 running side
4 strength support (steel cables)
5 conductor loop
6 woven support fabric
7 flex helix
8 single wire (wire filament)
9 conductor loop (spiral loop)
10 cross-connections
11 conductor loop (multiple loop)
12 cross-connections
13 woven support fabric
14 conductor loop (multiple loop)
15 cross-connections
16 corner fixation (corner seam)

The invention claimed is:

1. Conductor loop (5, 9, 11, 14) that is embedded in a polymer material, particularly an elastomer material, and is present as a flex construction, comprising a single flex, or multiple flexes, whereby each flex, in turn, is formed from 2 to 15 individual wires (8), particularly as a component of a conveyor belt (1), which comprises a support side (2), a running side (3), and an embedded strength support (4), whereby the conveyor belt is provided with at least one conductor loop, wherein the conductor loop (5, 9, 11, 14) is configured as an open flex helix (7), whereby each individual wire (8) is enclosed by polymer material; and wherein the individual wire diameter of the flex helix (7) is 0.01 to 0.2 mm.

2. Conductor loop according to claim 1, wherein the flex helix (7) is formed from 1 to 3 flexes.

3. Conductor loop according to claim 1, wherein each flex is formed from 5 to 9 individual wires (8).

4. Conductor loop according to claim 1, wherein the individual wire diameter of the flex helix (7) is 0.1 mm.

5. Conductor loop according to claim 1, wherein the conductor loop is configured as a spiral loop (9).

6. Conductor loop according to claim 1, wherein the conductor loon is configured as a multiple loop (11, 14).

7. Conductor loop according to claim 5, wherein the conductor loon has cross-connections (10, 12, 15).

8. Conductor loop according to claim 1, wherein the conductor loop is connected with a woven support fabric (6, 13).

9. Conductor loop according to claim 8, wherein the connection of the conductor loop (5, 9, 11, 14) with the woven support fabric (6, 13) takes place by means of sewing, gluing, vulcanizing, or clamping it on.

10. Conductor loop according to claim 8, wherein corner fixation (16) takes place.

11. Conductor loop according to claim 8, wherein in the case of a conveyor belt having a textile strength support, the woven support fabric is the strength support itself.

12. Conductor loop according to claim 1, wherein the conductor loop (5, 9, 11, 14) is provided with a cover.

13. Conductor loop according to claim 1, wherein the conductor loop is disposed within the support side (2) of the conveyor belt (1).

* * * * *